United States Patent
Hercz et al.

(10) Patent No.: US 12,242,830 B2
(45) Date of Patent: Mar. 4, 2025

(54) SYSTEM, METHOD, AND COMPUTER PROGRAM FOR COMPUTER PROGRAM CREATION FROM NATURAL LANGUAGE INPUT

(71) Applicant: Amdocs Development Limited, Limassol (CY)

(72) Inventors: Roni Hercz, Kfar Saba (IL); Doron Sterlicht, Tel Aviv (IL); Itai Jacobson, Rehovot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 195 days.

(21) Appl. No.: 18/082,337

(22) Filed: Dec. 15, 2022

(65) Prior Publication Data

US 2024/0201966 A1    Jun. 20, 2024

(51) Int. Cl.
| | | |
|---|---|---|
| *G06F 9/44* | (2018.01) | |
| *G06F 8/30* | (2018.01) | |
| *G06F 8/41* | (2018.01) | |
| *G06F 40/205* | (2020.01) | |
| *G06F 40/274* | (2020.01) | |
| *G10L 15/26* | (2006.01) | |

(52) U.S. Cl.
CPC ............... *G06F 8/41* (2013.01); *G06F 8/31* (2013.01); *G06F 40/205* (2020.01); *G06F 40/274* (2020.01); *G10L 15/26* (2013.01)

(58) Field of Classification Search
CPC ........ G06F 8/41; G06F 40/205; G06F 40/274; G06F 8/31; G10L 15/26
See application file for complete search history.

(56) References Cited

U.S. PATENT DOCUMENTS

| | | | |
|---|---|---|---|
| 11,245,592 B1 * | 2/2022 | Thomson | G06F 9/44505 |
| 2021/0233007 A1 * | 7/2021 | Lacy | G06Q 10/06316 |
| 2021/0343292 A1 * | 11/2021 | Cox | G06F 3/167 |
| 2022/0300560 A1 * | 9/2022 | Filice | G06F 16/90335 |

* cited by examiner

*Primary Examiner* — Hang Pan
(74) *Attorney, Agent, or Firm* — Zilka-Kotab, P.C.

(57) ABSTRACT

As described herein, a system, method, and computer program are provided for creating a computer program from natural language input. Input is received from a natural language processor. The input is processed, using a machine learning model, to predict an intent of the input. A validation of the intent is performed. The intent is automatically converted to one or more executable computer commands, based on a result of the validation of the intent. The one or more executable computer commands are executed to generate a computer program.

12 Claims, 7 Drawing Sheets

SYSTEM, METHOD, AND COMPUTER PROGRAM FOR COMPUTER PROGRAM CREATION FROM NATURAL LANGUAGE INPUT

FIELD OF THE INVENTION

The present invention relates to techniques for creating new computer programs.

BACKGROUND

Current techniques used to create computer programs include either manually programming (coding) a computer program or using a drag and drop tool in a graphical interface to manually add and organize components for flows and pages in an online application. However, these current techniques to create computer programs do not take advantage of the natural language processing technology that is otherwise available for other tasks.

There is thus a need for addressing these and/or other issues associated with the prior art.

SUMMARY

As described herein, a system, method, and computer program are provided for creating a computer program from natural language input. Input is received from a natural language processor. The input is processed, using a machine learning model, to predict an intent of the input. A validation of the intent is performed. The intent is automatically converted to one or more executable computer commands, based on a result of the validation of the intent. The one or more executable computer commands are executed to generate a computer program.

DETAILED DESCRIPTION

Figure 1:
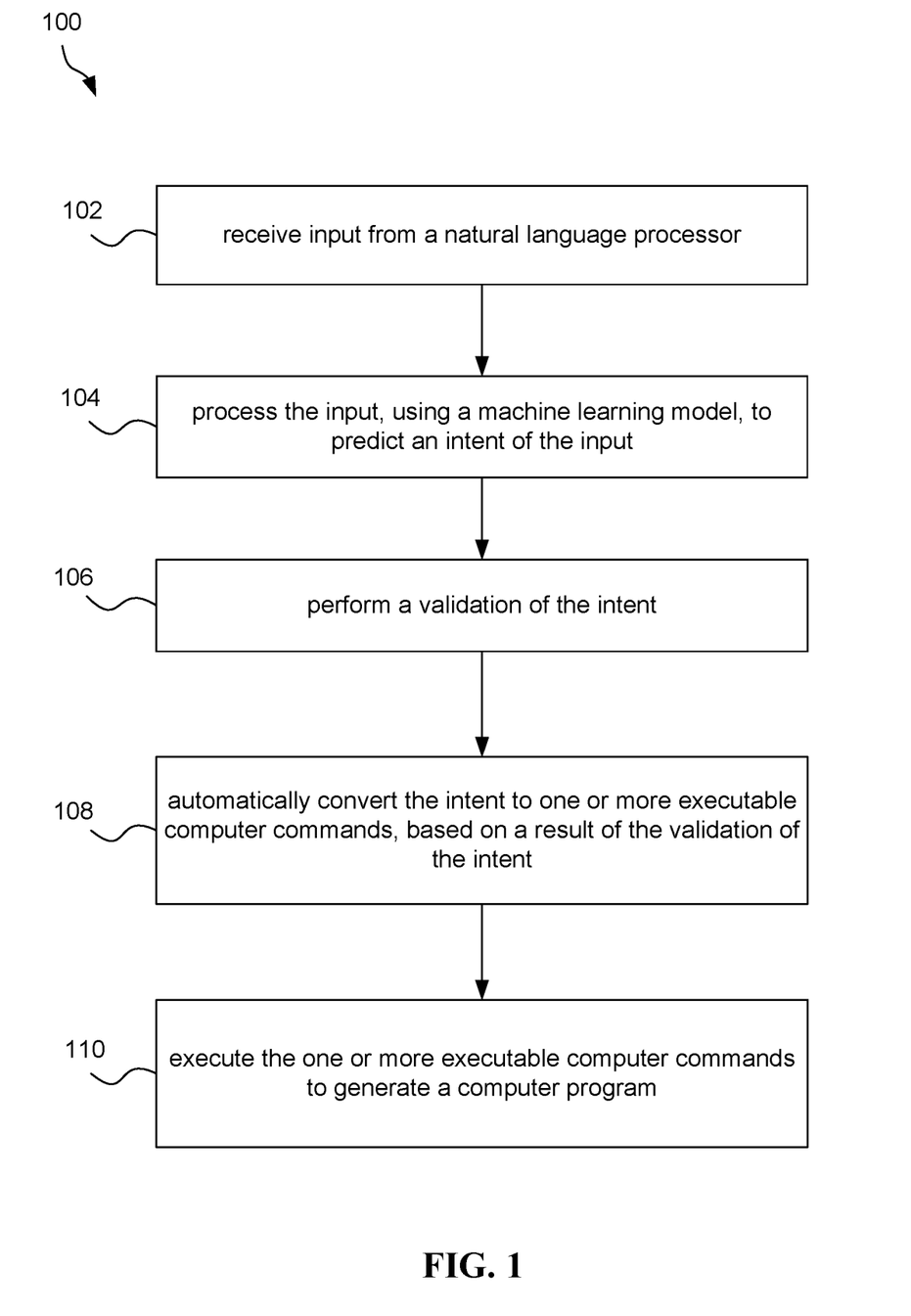
FIG. 1 illustrates a flowchart of a method for creating a computer program from natural language input, in accordance with one embodiment.

FIG. 1 illustrates a method 100 for creating a computer program from natural language input, in accordance with one embodiment. The method 100 may be performed by any computer system described below with respect to FIGS. 6 and/or 7. In embodiments, the method 100 may be performed by a computer system of a cloud-based platform or an on-premises platform.

In operation 102, input is received from a natural language processor. The input that is received from the natural language processor refers to any data output by the natural language processor. In an embodiment, the data output by the natural language processor is parsed text, such as text broken down into smaller semantic units, with added tags, standardization, and/or filters applied.

The natural language processor is hardware and/or software configured to apply natural language processing (NLP) to a natural language text to generate the data for output. In an embodiment, the natural language text may be manually entered by a user (e.g. via a user interface). In another embodiment, the natural language text may be generated from a natural language voice command provided by a user (e.g. via a voice recording interface), namely where the natural language voice command is converted (e.g. transcribed) to the natural language text.

In operation 104, the input is processed, using a machine learning model, to predict an intent of the input. The machine learning model may include any model trained by a machine learning algorithm to predict an intent from a given input. In an embodiment, the model may be trained using supervised learning.

In an embodiment, the intent refers to the intention of the user's original provided natural language text or voice command. In an embodiment, the intent may be one of a plurality of predefined intents that are convertible to executable computer commands. With respect to the present description, the intent is to perform some function related to creating a computer program.

In an embodiment, the intent may be predicted based on a location within a user interface at which the user is working, or has his focus, at the time during which the user enters a natural language input (i.e. text or voice as mentioned above). For example, if the user speaks the phrase "make it red" while working or focusing on a particular portion of the user interface (e.g. text, image, box, etc.), then the intent will be predicted in the context of that portion of the user interface. Thus, the machine learning model may take as input an indication of where in a user interface the user is working/focused in order to predict the intent of the input. For example, if the user is working on some text, the intent will be different than when the user is connecting an application programming interface (API), which again is different from when the user is working on graphics or deploying an application. It is of course also possible to change focus using natural language.

In operation 106, a validation of the intent is performed. The validation refers to any function defined for validating the intent prior to performing operation 108 (described below). In an embodiment, the performing the validation may include determining whether parameters of the intent are complete (i.e. whether any additional details are needed from the user to predict a complete intent). The parameters may be values or other information required to perform the intended function, for example. In this embodiment, when it is determined that the parameters of the intent are not complete, then a natural language dialog interface may be presented to the user to refine the intent by providing the missing or required parameters.

In another embodiment, performing the validation of the intent may include determining whether one or more next intents are to be suggested to a user. For example, certain intents may be determined to correlate with certain other (next) intents. In an embodiment, these next intents may be determined for the given intent using a machine learning model. In this embodiment, when it is determined that one or more next intents are to be suggested to the user, then the natural language dialog interface may be presented to the user to suggest the one or more next intents as selectable options. The user may refine the intent by selecting at least one of the next intents via a manual click or via a voice command (i.e. where the refined intent includes the given intent and the next intent).

In operation 108, the intent is automatically converted to one or more executable computer commands, based on a result of the validation of the intent. For example, if the intent is determined to be valid as-is (e.g. the parameters of the intent are complete), then the intent, as output by the machine learning model, may be automatically converted to one or more executable computer commands. On the other hand, if the validation causes a refined intent to be provided, then automatically converting the intent may involve automatically converting the refined intent to the one or more executable computer commands.

In an embodiment, the intent may be automatically converted to the one or more executable computer commands, as mentioned above, using a script and a compiler. In an embodiment, the script and compiler may reference a database of predefined executable computer commands for use in automatically converting the intent. The executable computer commands may be functions that accomplish the intent.

In operation 110, the one or more executable computer commands are executed to generate a computer program. In an embodiment, the one or more executable computer commands may alter a user interface of the computer program. In another embodiment, the one or more executable computer commands may alter a flow of the computer program. In another embodiment, the one or more executable computer commands may alter a functionality of the computer program.

To this end, while computer programs have traditionally been created via manual coding or manual input through a visual tool, both of which require a certain expertise by the user, the present method 100 allows for creating a computer program from natural language input, which can simplify the expertise needed by the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
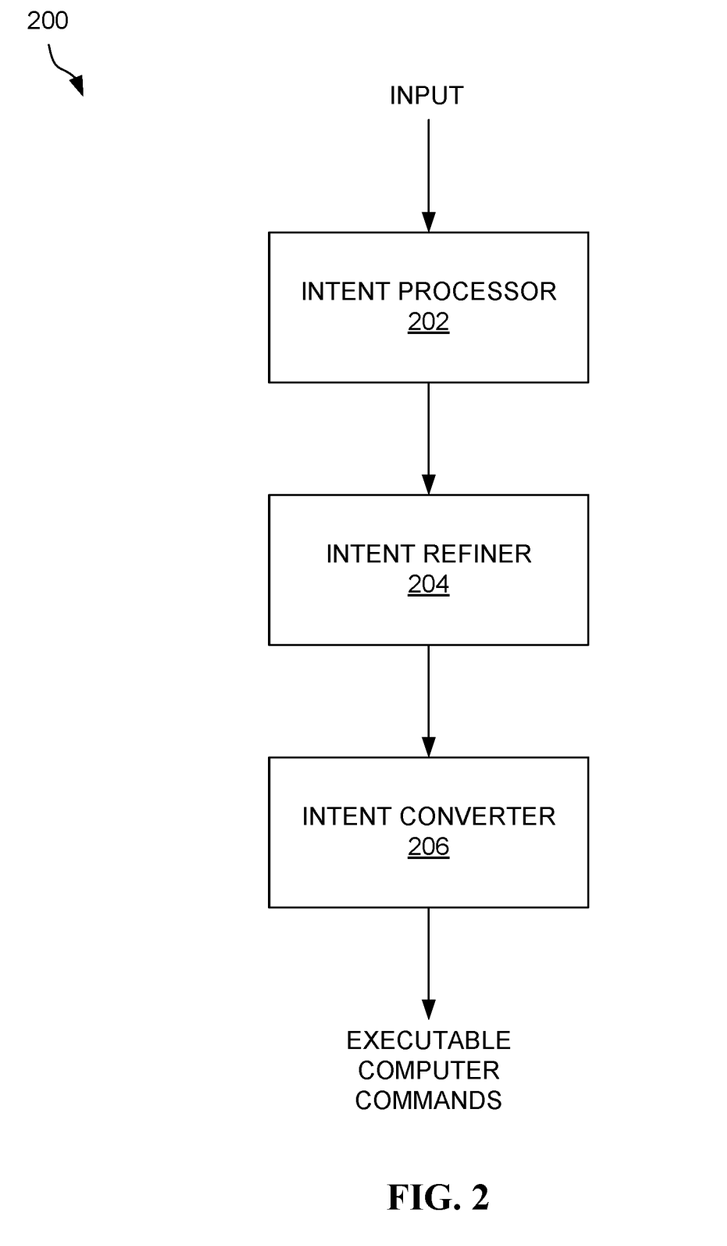
FIG. 2 illustrates a flow diagram of a system for creating a computer program from natural language input, in accordance with one embodiment.

FIG. 2 illustrates a flow diagram of a system 200 for creating a computer program from natural language input, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an input is provided to an intent processor 202. With respect to the present embodiment, the input is provided to the intent processor 202 by a natural language processor (not shown). The natural language processor may process a user provided input, such as a text or voice command. Of course, in another embodiment the user provided input may be provided directly to the intent processor 202. An additional input may also be provided to the intent processor 202, such as a context of the input. The context of the input may be a location or item in a user interface on which a user is working/focused at the time the user provides his input. Thus, in an embodiment, the system 200 may monitor user actions within the user interface (e.g. hovering a mouse pointer over a particular item in the user interface, working on a particular item in the user interface, etc.) to detect the context of any input provided by the user. The intent processor 202 processes the input (and the additional input when provided), using a machine learning model, to predict an intent of the input.

The intent is then output by the intent processor 202 to an intent refiner 204. The intent refiner 204 performs a validation of the intent. The validation may include generating a refined intent, as needed, and/or identifying any correlated next intents, as desired by the user.

The intent(s) output by the intent refiner 204 are provided as input to an intent converter 206. The intent converter 206 automatically converts the intent(s) to executable computer commands. The executable computer commands can then be executed to generate the computer program.

Figure 3:
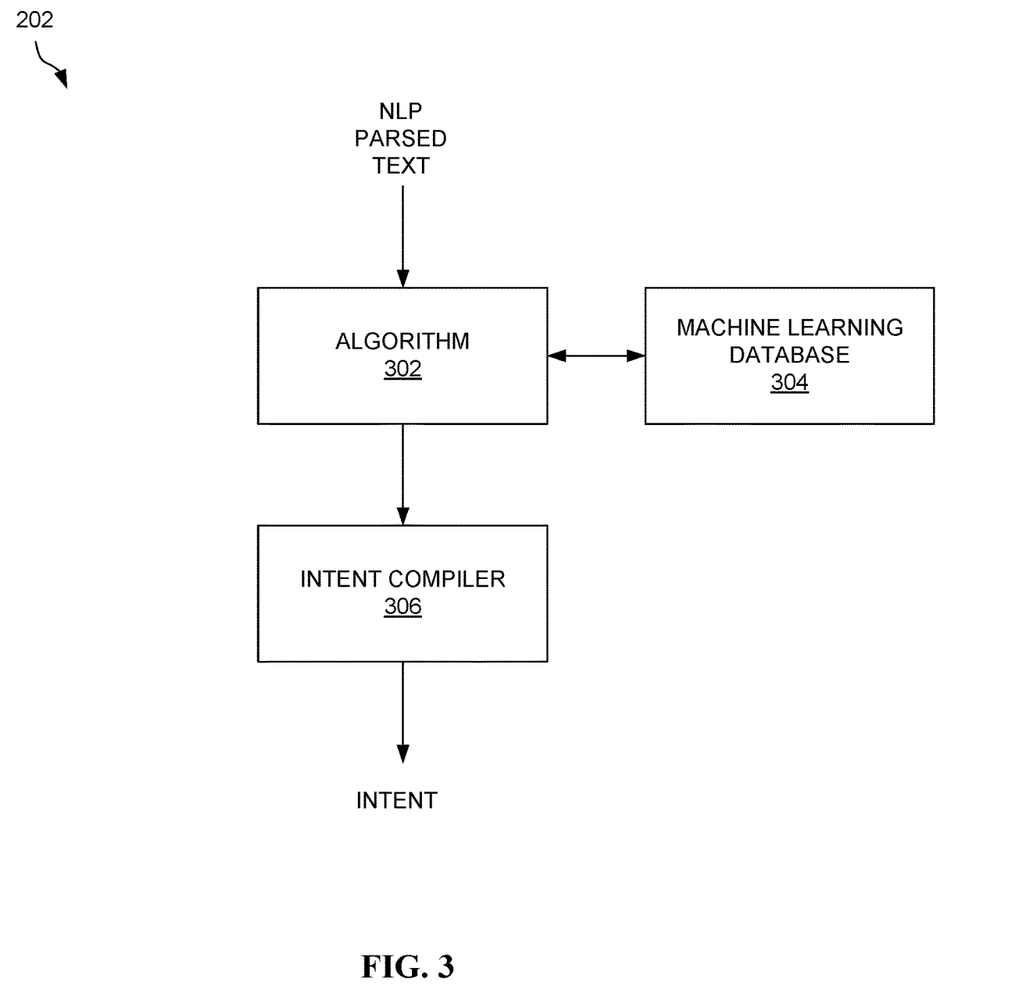
FIG. 3 illustrates a block diagram of the components of the intent processor of FIG. 2, in accordance with one embodiment.

FIG. 3 illustrates a block diagram of the components of the intent processor 202 of FIG. 2, in accordance with one embodiment.

As shown, the intent processor 202 receives as input a NLP parsed text (i.e. from a natural language processor). An algorithm 302 of the intent processor 202 processes the NLP parsed text, using a machine learning model in a machine learning database 304, to predict an intent of the input. An intent compiler 306 of the intent processor 202 compiles the prediction into an intent capable of being validated by the intent refiner 204.

Figure 4:
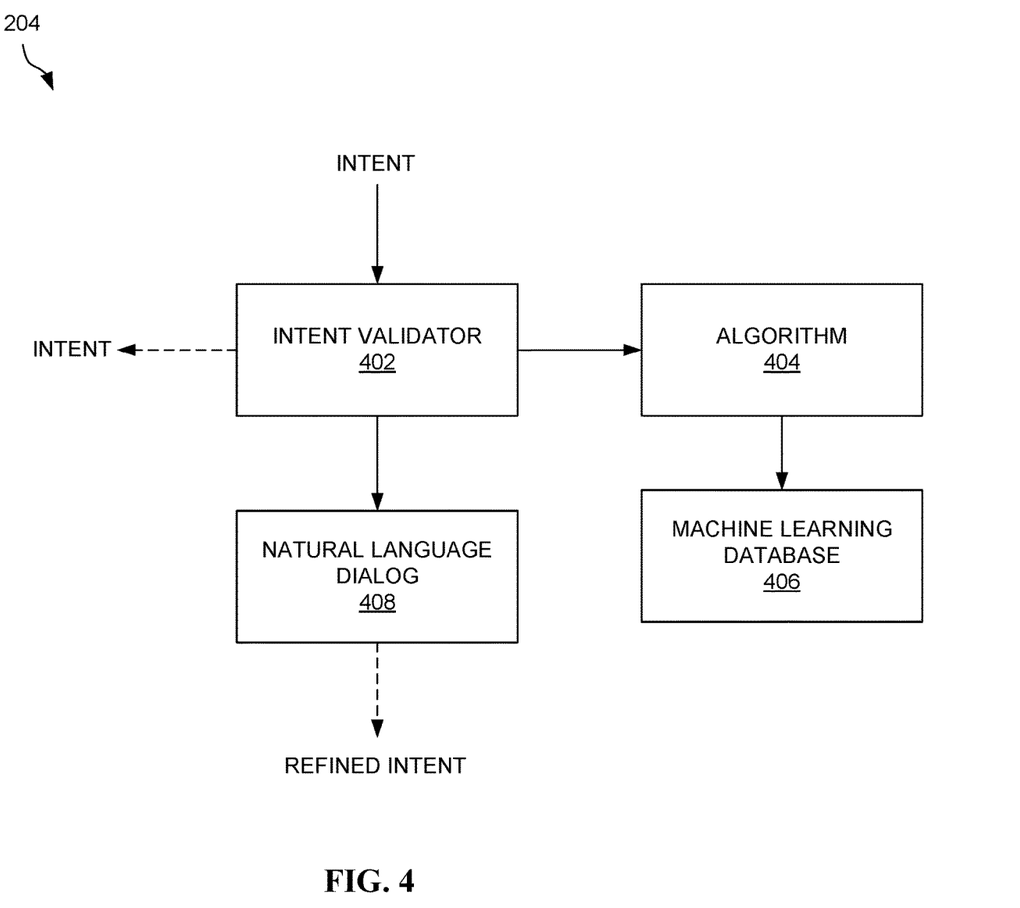
FIG. 4 illustrates a block diagram of the components of the intent refiner of FIG. 2, in accordance with one embodiment.

FIG. 4 illustrates a block diagram of the components of the intent refiner 204 of FIG. 2, in accordance with one embodiment.

As shown, the intent refiner 204 receives as input the intent output by the intent processor 202. The intent refiner 204 includes an intent validator 402 that performs a validation of the intent. The intent refiner 204 provides the intent to an algorithm 404 which uses a machine learning model included a machine learning database 406 to determine whether the intent is valid.

As shown, if the intent is valid, then the intent is output for conversion to one or more executable computer commands, as described with reference to the intent converter 206 described below. If the intent is not valid, then further processing may be performed to generate a refined intent to be output for conversion to one or more executable computer commands.

In an embodiment, the intent validator 402 may determine that parameters of the intent are not complete, in which case a natural language dialog 408 may be used to allow the user to refine the intent to complete the parameters. In another embodiment, the intent validator 402 may determine that one or more next intents are to be suggested to a user, in which case natural language dialog 408 may be used to allow the user refine the intent by selecting any next intents for the given intent.

Figure 5:
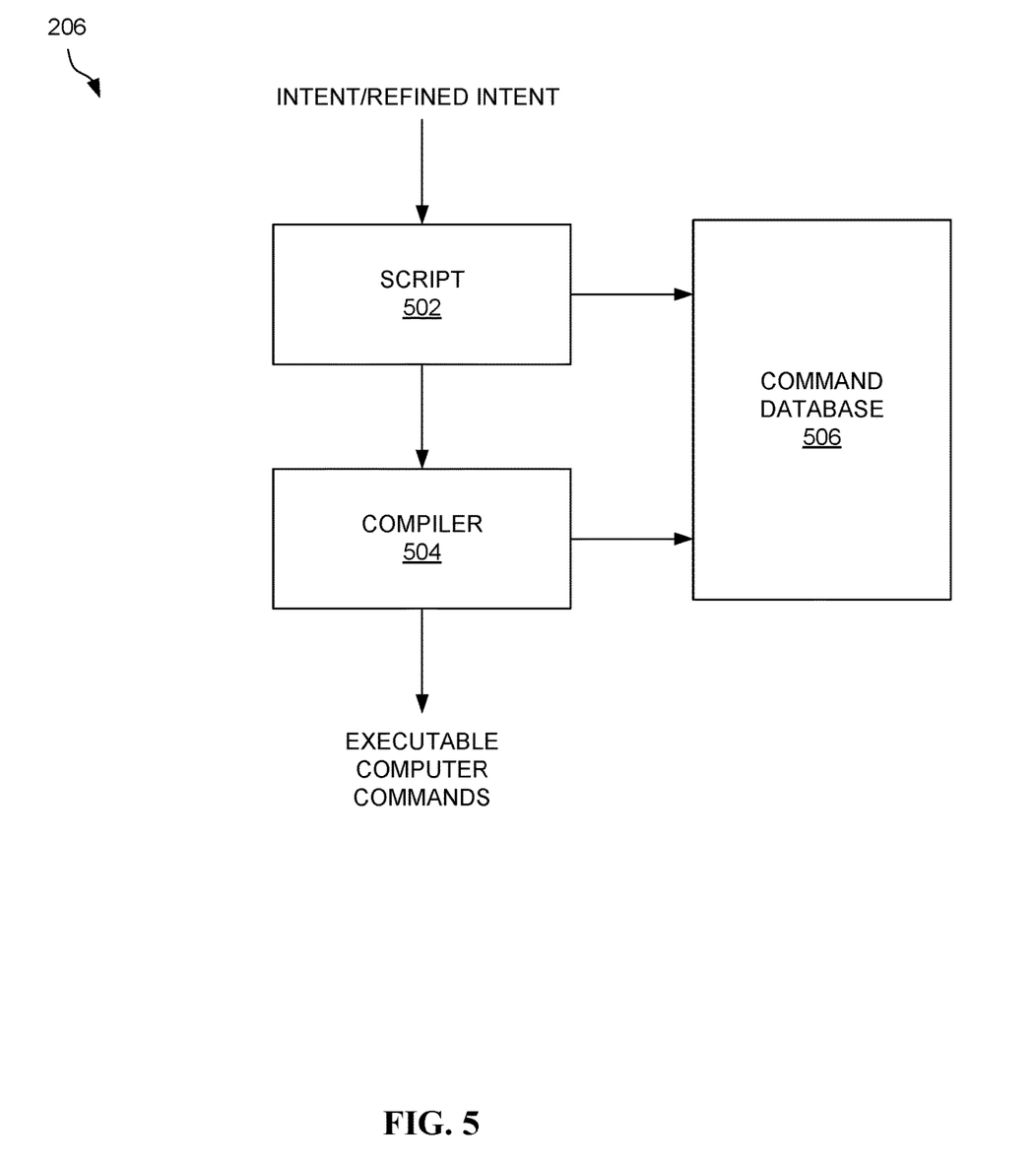
FIG. 5 illustrates a block diagram of the components of the intent converter of FIG. 2, in accordance with one embodiment.

FIG. 5 illustrates a block diagram of the components of the intent converter 206 of FIG. 2, in accordance with one embodiment.

As shown, the intent converter 206 receives as input the intent or the refined intent output by the intent refiner 204. The intent converter 206 runs a script 502 to convert the input to one or more executable computer commands, with the help its internal command compiler 504 and a command database 506. The executable computer command(s) are output by the intent converter 206 for execution thereof to generate a computer program. For example, the system 200 of FIG. 2, or another system, may include a processor that will then run the executable computer command(s) to create or amend Json files for the computer program and/or render the output on the system's computer.

Figure 6:
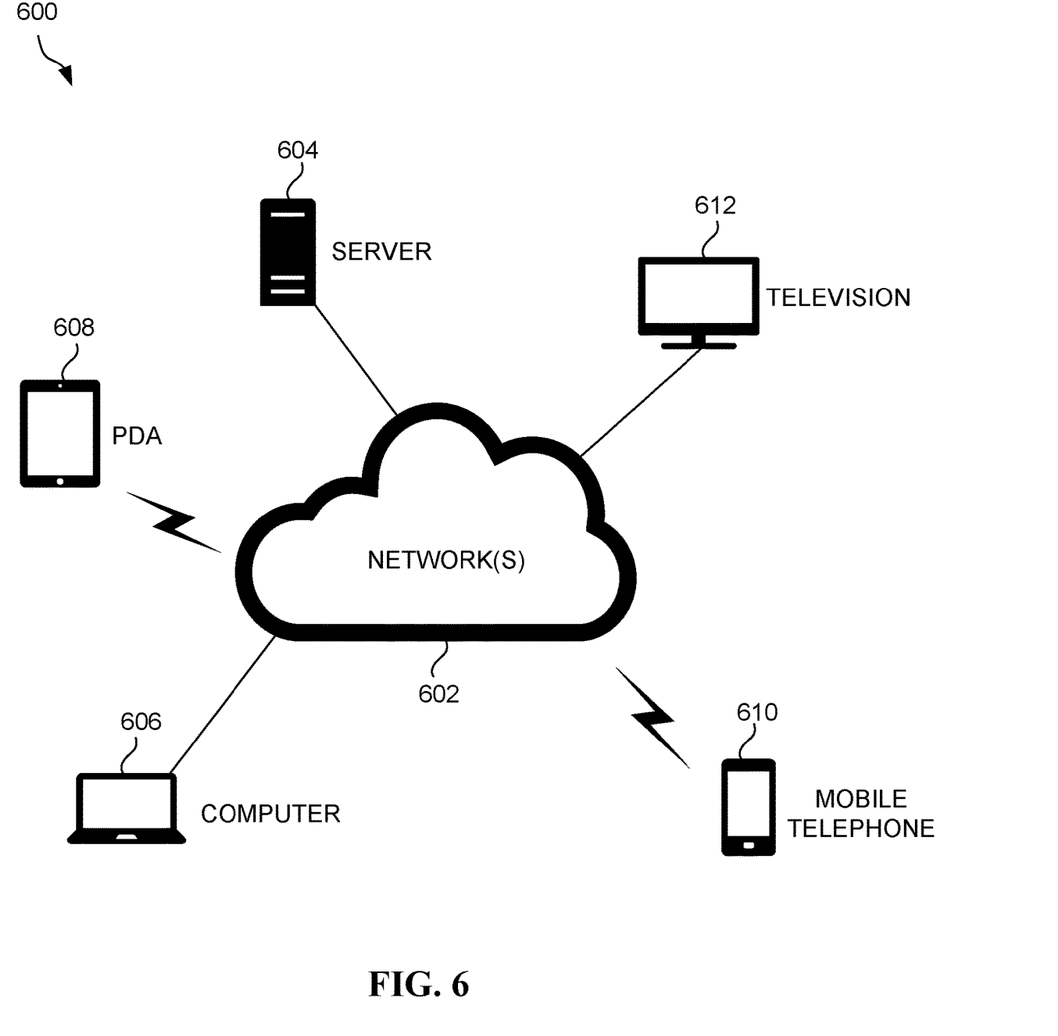
FIG. 6 illustrates a network architecture, in accordance with one possible embodiment.
Figure 7:
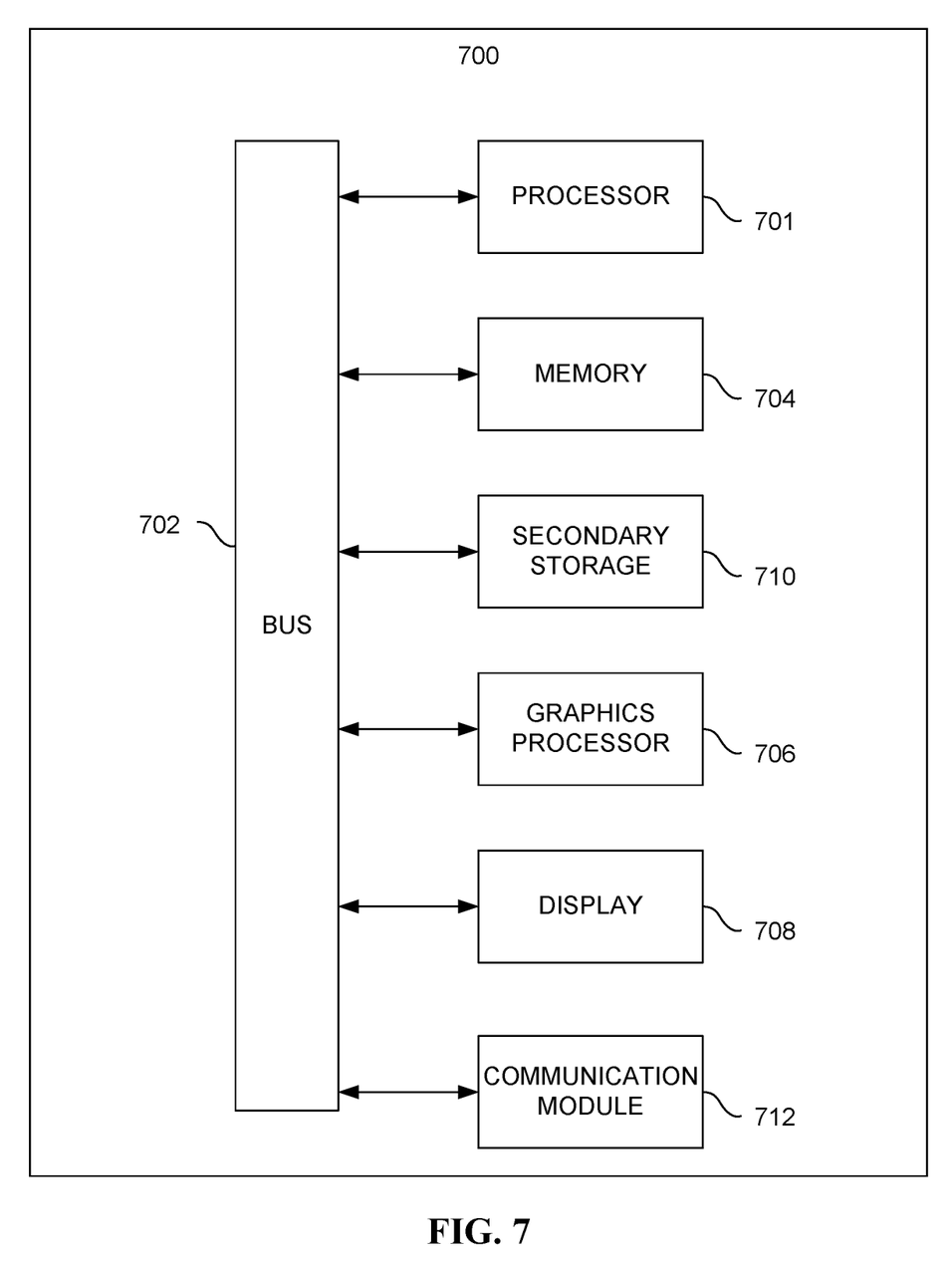
FIG. 7 illustrates an exemplary system, in accordance with one embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive a natural language input from a user;
   process the natural language input by a natural language processor to generate a parsed text of the natural language input;
   determine a context of the natural language input, wherein the context includes an action of the user within a graphical user interface at a time that the natural language input is provided by the user;
   process the parsed text of the natural language input and the context of the natural language input, using a machine learning model, to predict an intent of the natural language input, wherein the intent is to perform a specific function related to creating a computer program;
   perform a validation of the intent, including:
      determining that parameters required to perform the specific function are complete, and
      determining that the intent is not required to be refined with a next intent;
   in response to the validation of the intent including determining that parameters required to perform the specific function are complete and determining that the intent is not required to be refined with a next intent, then automatically convert the intent to one or more executable computer commands configured to perform the specific function related to creating the computer program, wherein the intent is converted by a script and compiler that reference a database of predefined executable computer commands; and
   execute the one or more executable computer commands to perform the specific function related to creating the computer program.

2. The non-transitory computer-readable media of claim 1, wherein the natural language processor applies natural language processing to the natural language input to generate the parsed text.

3. The non-transitory computer-readable media of claim 1, wherein the intent is one of a plurality of predefined intents that are convertible to executable computer commands.

4. The non-transitory computer-readable media of claim 1, wherein when it is determined that the parameters required to perform the specific function are not complete, then the device is further caused to:
   present a natural language dialog interface to the user to refine the intent.

5. The non-transitory computer-readable media of claim 4, wherein the refined intent is automatically converted to the one or more executable computer commands.

6. The non-transitory computer-readable media of claim 1, wherein when it is determined that the intent is required to be refined with a next intent, then the device is further caused to:
   present an interface to the user suggesting the one or more next intents as selectable options for the user.

7. The non-transitory computer-readable media of claim 6, wherein the device is further caused to:
   identify at least one next intent of the one or more next intents that was selected by the user.

8. The non-transitory computer-readable media of claim 7, wherein automatically converting the intent to one or more executable computer commands includes:
   automatically converting the intent and the at least one next intent into the one or more executable computer commands.

9. The non-transitory computer-readable media of claim 1, wherein the one or more executable computer commands are configured to alter the user interface of the computer program.

10. The non-transitory computer-readable media of claim 1, wherein the one or more executable computer commands are configured to alter a flow of the computer program.

11. A method, comprising:
    at a computer system:
    receiving a natural language input from a user;
    processing the natural language input by a natural language processor to generate a parsed text of the natural language input;
    determining a context of the natural language input, wherein the context includes an action of the user within a graphical user interface at a time that the natural language input is provided by the user;

processing the parsed text of the natural language input and the context of the natural language input, using a machine learning model, to predict an intent of the natural language input, wherein the intent is to perform a specific function related to creating a computer program;

performing a validation of the intent, including:
  determining that parameters required to perform the specific function are complete, and
  determining that the intent is not required to be refined with a next intent;

in response to the validation of the intent including determining that parameters required to perform the specific function are complete and determining that the intent is not required to be refined with a next intent, then automatically converting the intent to one or more executable computer commands configured to perform the specific function related to creating the computer program, wherein the intent is converted by a script and compiler that reference a database of predefined executable computer commands; and executing the one or more executable computer commands to perform the specific function related to creating the computer program.

12. A system, comprising:

a non-transitory memory storing instructions; and one or more processors in communication with the non-transitory memory that execute the instructions to:

receive a natural language input from a user;

process the natural language input by a natural language processor to generate a parsed text of the natural language input;

determine a context of the natural language input, wherein the context includes an action of the user within a graphical user interface at a time that the natural language input is provided by the user;

process the parsed text of the natural language input and the context of the natural language input, using a machine learning model, to predict an intent of the natural language input, wherein the intent is to perform a specific function related to creating a computer program;

perform a validation of the intent, including:
  determining that parameters required to perform the specific function are complete, and
  determining that the intent is not required to be refined with a next intent;

in response to the validation of the intent including determining that parameters required to perform the specific function are complete and determining that the intent is not required to be refined with a next intent, then automatically convert the intent to one or more executable computer commands configured to perform the specific function related to creating the computer program, wherein the intent is converted by a script and compiler that reference a database of predefined executable computer commands; and execute the one or more executable computer commands to perform the specific function related to creating the computer program.

\* \* \* \* \*